(No Model.)

W. F. BECK.
Piano Truck.

No. 228,857.          Patented June 15, 1880.

WITNESSES
Robert Everett
Chas. G. Page

INVENTOR
William F. Beck
Gilmore Smith & Co.,
ATTORNEYS

UNITED STATES PATENT OFFICE.

WILLIAM F. BECK, OF BELLEFONTE, PENNSYLVANIA.

PIANO-TRUCK.

SPECIFICATION forming part of Letters Patent No. 228,857, dated June 15, 1880.

Application filed April 5, 1880. (No model.)

*To all whom it may concern:*

Be it known that I, WILLIAM F. BECK, of Bellefonte, in the county of Centre and State of Pennsylvania, have invented certain new and useful Improvements in Upright-Piano Trucks; and I do hereby declare that the following is a full, clear, and exact description of the construction and operation of the same, reference being had to the annexed drawings, making a part of this specification, and to the letters and figures of reference marked thereon.

Figure 1:
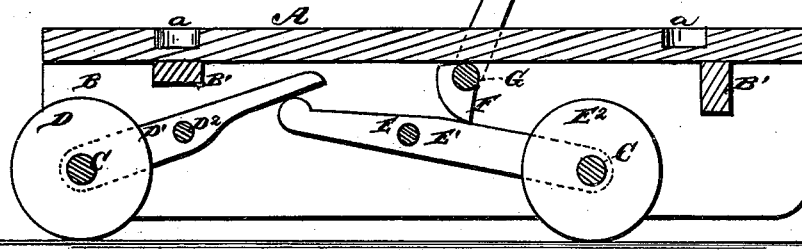
Figure 2:
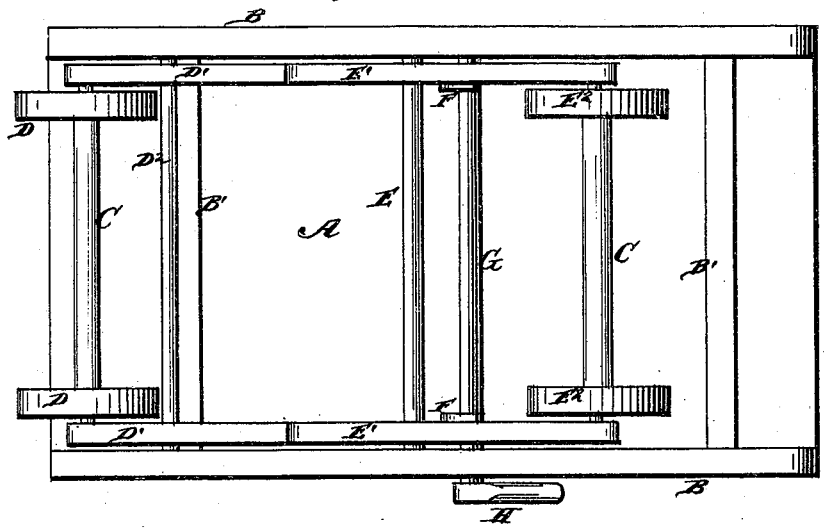

Figure 1 of the drawings is a longitudinal section of my piano-truck, and Fig. 2 is a bottom view of the same.

The object of my invention is, mainly, to construct a truck for removing pianos or other very heavy articles by first letting the truck-frame down so that it will rest upon the ground or floor, and thus be held stationary while receiving the load, and then raising the frame so that the weight is transferred to the wheels, thereby enabling the operator to draw or push the truck with ease.

The invention consists in a truck constructed and adapted for the above purpose, and also in the features of construction and combination hereinafter fully set forth, and particularly pointed out in the claim.

The truck-frame is composed of a platform, A, with sides B and cross-bars B', the platform being formed with four holes, $a$ $a$, to receive the lower ends of a piano's legs. The four truck-wheels are mounted upon axles C, which are journaled in pivoted levers, the pivots of the said levers being rods secured at their ends to the side of the truck-frame.

The wheels D are arranged at or near one end of the truck-frame, the axle thereof being journaled in the ends of the pivoted levers D', the pivot $D^2$ of which is secured to the sides of the truck-frame near one end thereof.

The pivot E of the levers E' is arranged near the center of the frame, thus bringing the wheels $E^2$ and their axle much nearer to the center of the frame than the wheels D. By thus arranging one pair of wheels at this distance from the end of the truck-frame the truck can be the more readily turned, and, further, it admits of one end being raised for the purpose of placing it on a stair.

The device for raising the entire truck-frame consists in two cams, F, upon a rod, G, which is partially rotated by a hand-lever, H. This rod G has its bearings in the sides of the truck-frame, and the cams upon it bear down upon the pivoted levers to which the axle of one pair of wheels is journaled. When the hand-lever is liberated the sides of the truck-frame will rest upon the ground or floor, while the wheels will be between said sides. When, however, it is desired to raise the truck-frame the operator will turn the hand-lever so as to cause the cams on the rod G to act upon a pair of the pivoted levers, and these in turn act upon the next pair of pivoted levers, thereby forcing down the wheels and raising the truck-frame.

It will be observed that the ends of the levers which are actuated by the cams extend under the ends of the levers of the next pair, there being no other connection between the two pairs of levers.

Having thus described my invention, what I claim is—

In a truck, the combination of the truck-frame with two pairs of vibratory levers carrying the wheels, and a rock-shaft with cams adapted to act upon one pair of said levers, which acts upon the remaining pair, whereby the truck-frame is either raised or lowered, substantially in the manner and for the purpose set forth.

In testimony that I claim the above I have hereunto subscribed my name in the presence of two witnesses.

WILLIAM F. BECK.

Witnesses:
HENRY BECK,
WM. IRWIN.